United States Patent [19]

Standke

[11] Patent Number: 4,775,117
[45] Date of Patent: Oct. 4, 1988

[54] THERMAL MODULATING CONTROL VALVE

[75] Inventor: Helmut Standke, Woodland Hills, Calif.

[73] Assignee: Eaton Corporation, Cleveland, Ohio

[21] Appl. No.: 918,847

[22] Filed: Oct. 14, 1986

[51] Int. Cl.⁴ .................... B64D 15/20; B64D 15/04
[52] U.S. Cl. ........................ 244/134 F; 244/134 R; 244/134 B
[58] Field of Search ........... 244/134 R, 134 B, 134 F; 137/625.48, 561 R; 251/30.05, 30.02

[56] References Cited

U.S. PATENT DOCUMENTS

| | | | |
|---|---|---|---|
| 2,551,697 | 5/1951 | Palmatier | 244/134 B |
| 2,563,054 | 8/1951 | Messinger et al. | 244/134 B |
| 2,711,453 | 6/1955 | Leigh, Jr. | 244/134 B |
| 2,737,874 | 3/1956 | Gallay et al. | 244/134 B |
| 3,749,336 | 7/1973 | Christensen et al. | 244/134 B |
| 4,501,298 | 2/1985 | Inada et al. | 137/625.48 |
| 4,535,815 | 8/1985 | Ohumi et al. | 137/625.48 |

Primary Examiner—Galen Barefoot
Assistant Examiner—Rodney Corl
Attorney, Agent, or Firm—L. G. Vande Zande

[57] ABSTRACT

A thermal modulating control valve adapted for supplying thermal modulated bleed air for an aircraft anti-icing system comprises a valve body having an inlet adapted to be supplied with bleed air from a separate source and an anti-icing outlet for supplying thermal modulated bleed air for operating an aircraft anti-icing system. The thermal modulating valve is mounted in the body in communication with the inlet and outlet for supplying bleed air at a regulated flow rate which is reduced in response to increased temperature of the bleed air supplied to the valve. The thermal modulating valve includes at least one annular seating ring having a central bore and mounted on a support element, and the seating ring includes an annular ring sleeve spaced outwardly of the support element having at least one radial annular face concentrically mounted on the support element. At least one annular, bimetal, temperature sensitive creep disc is mounted on the support element having an outer edge portion deformable toward and away from the annular face of the ring sleeve in response to temperature changes for regulating the flow area between the disc and the ring sleeve for controlling the flow of bleed air to an anti-icing outlet in the valve body.

24 Claims, 9 Drawing Sheets

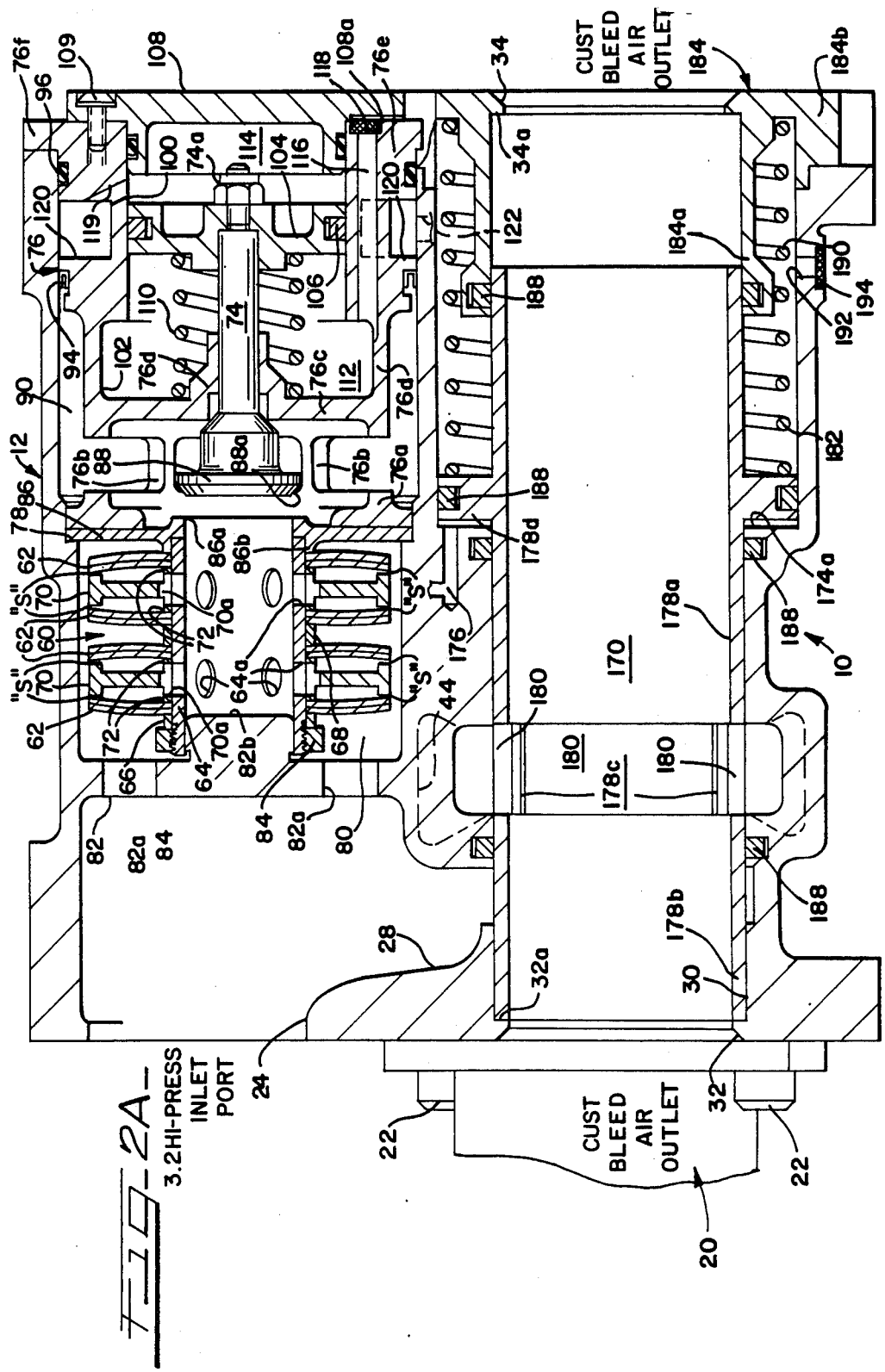

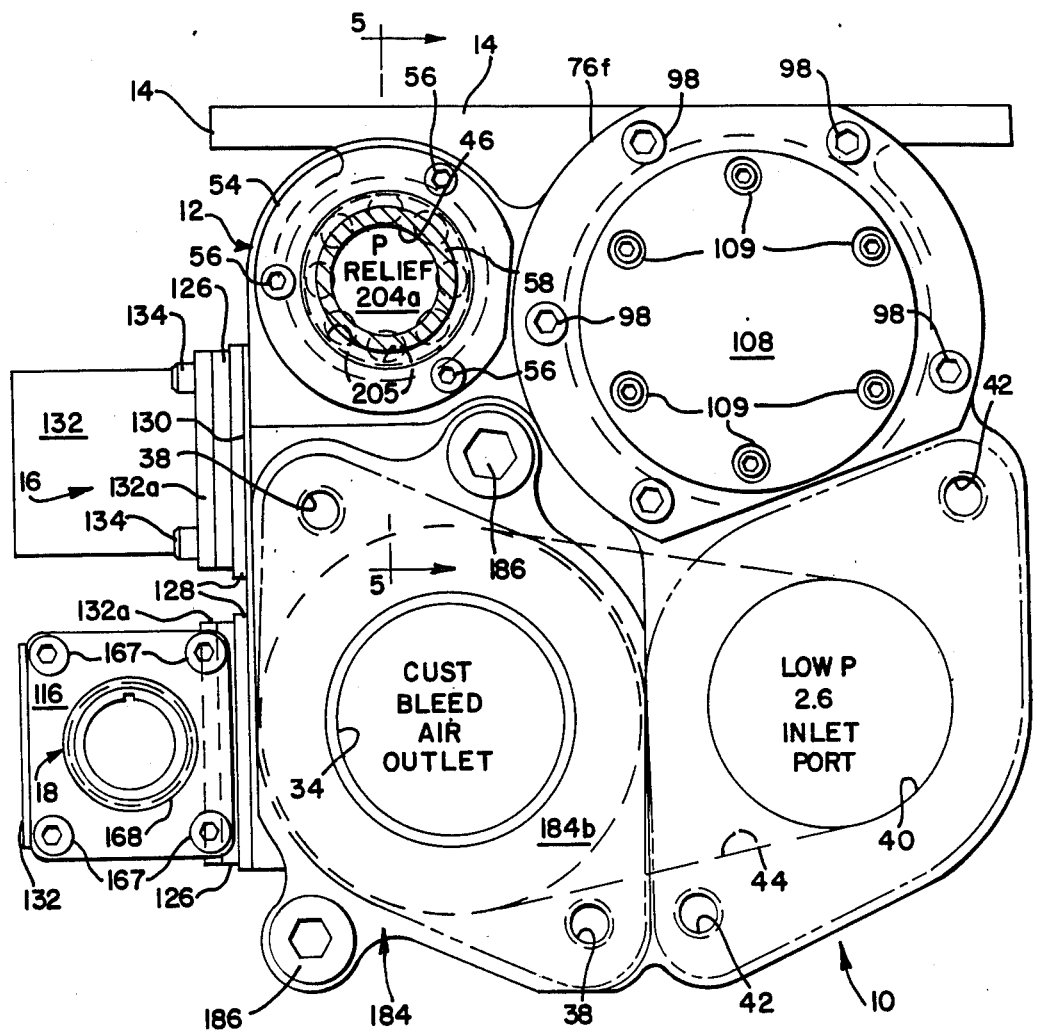
FIG_3_

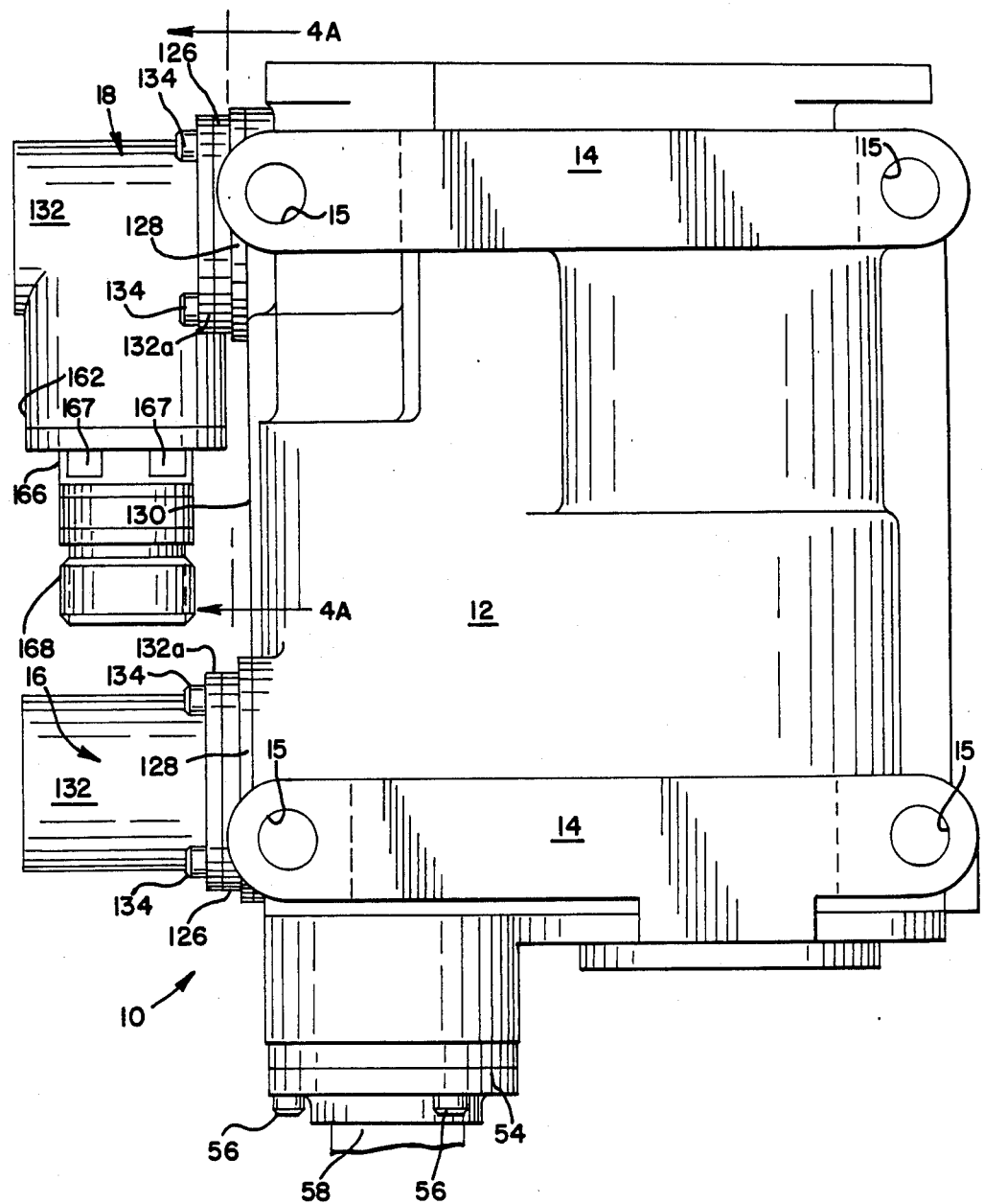

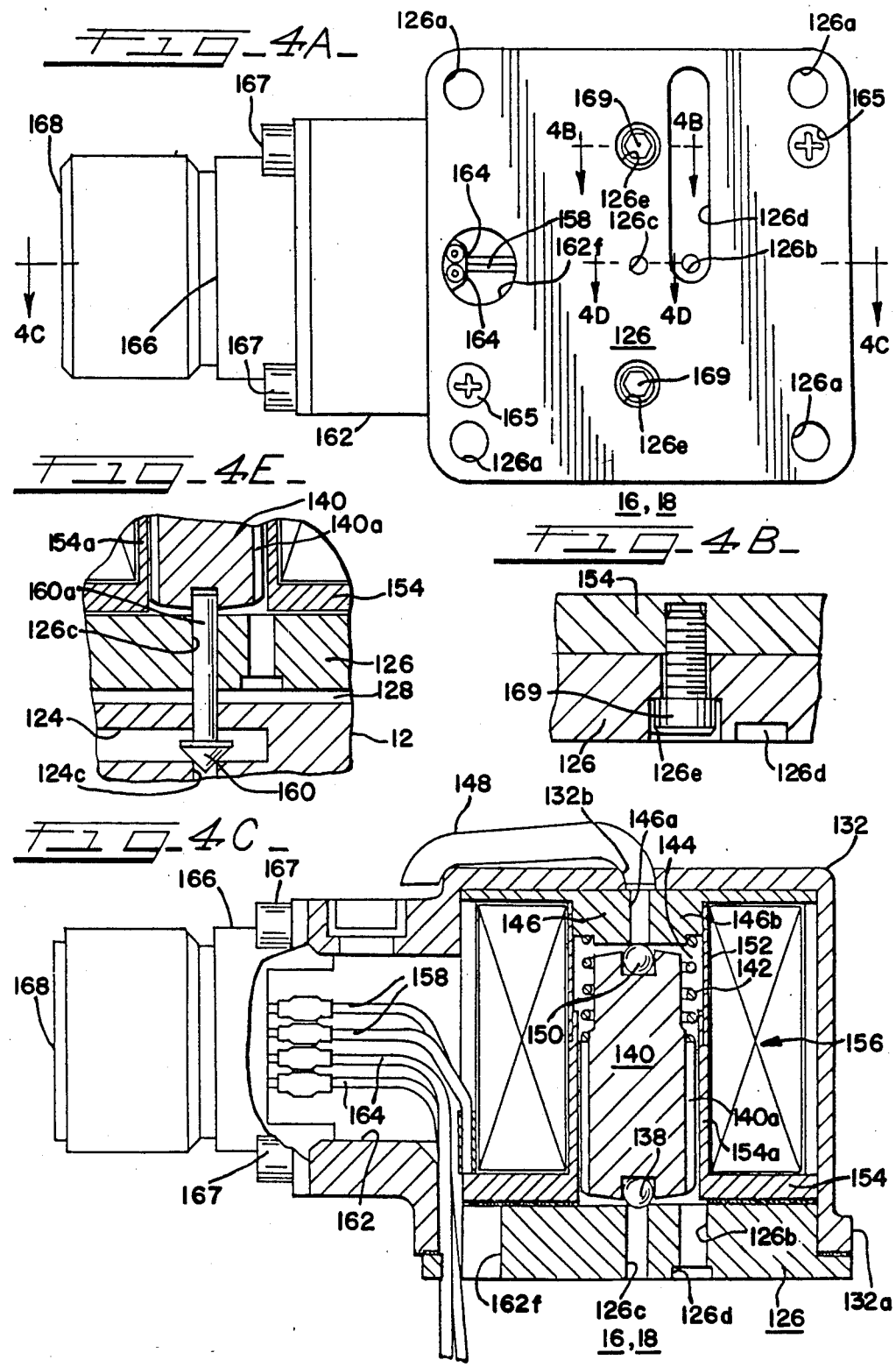

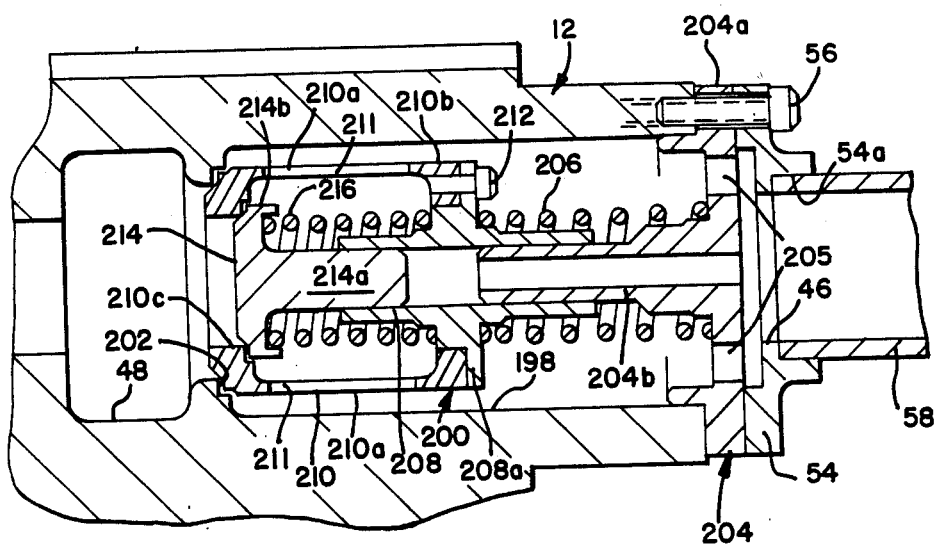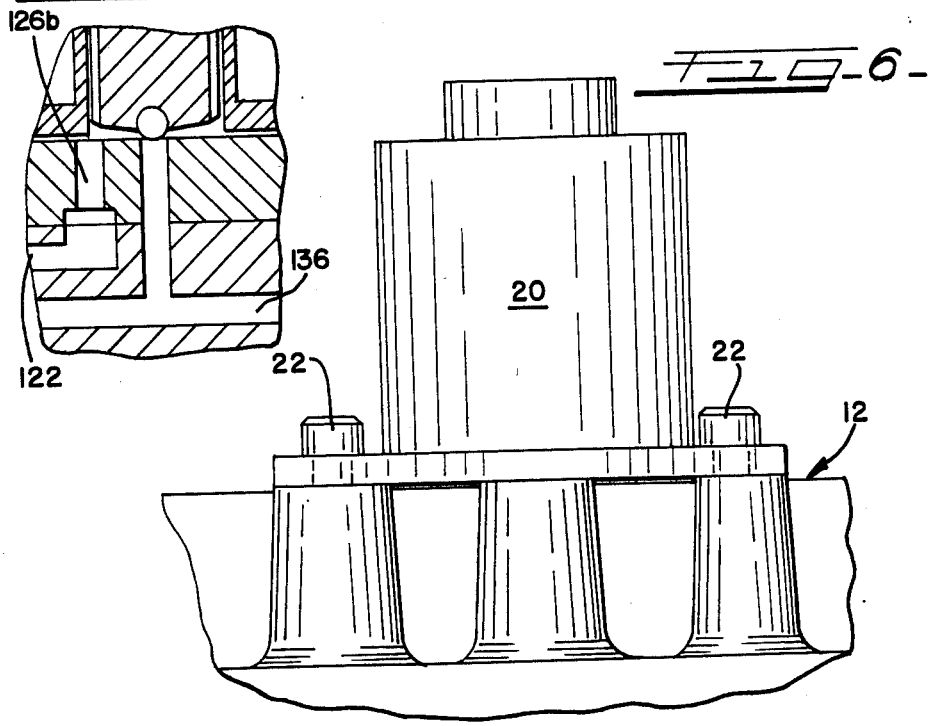

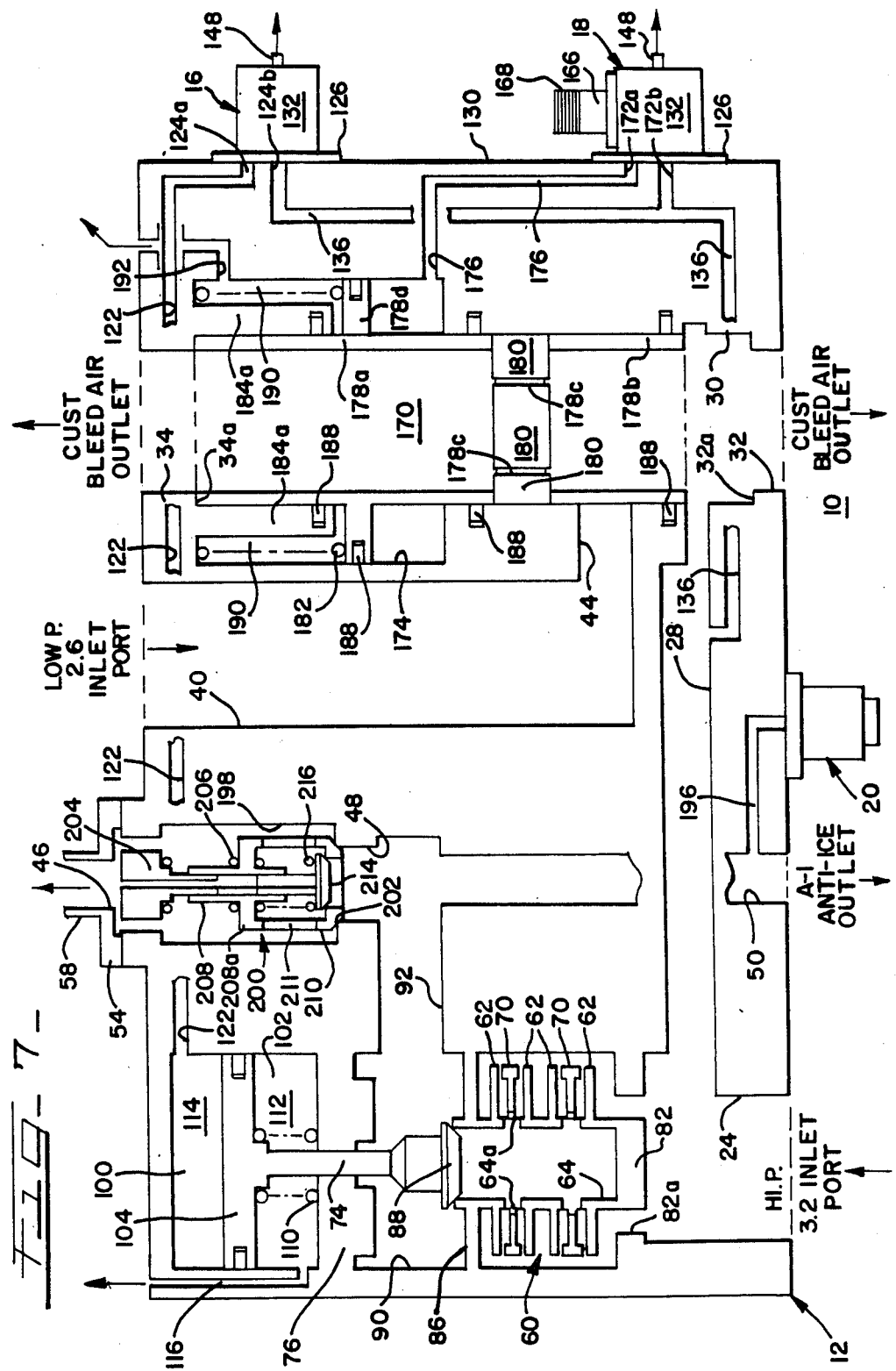

FIG_8
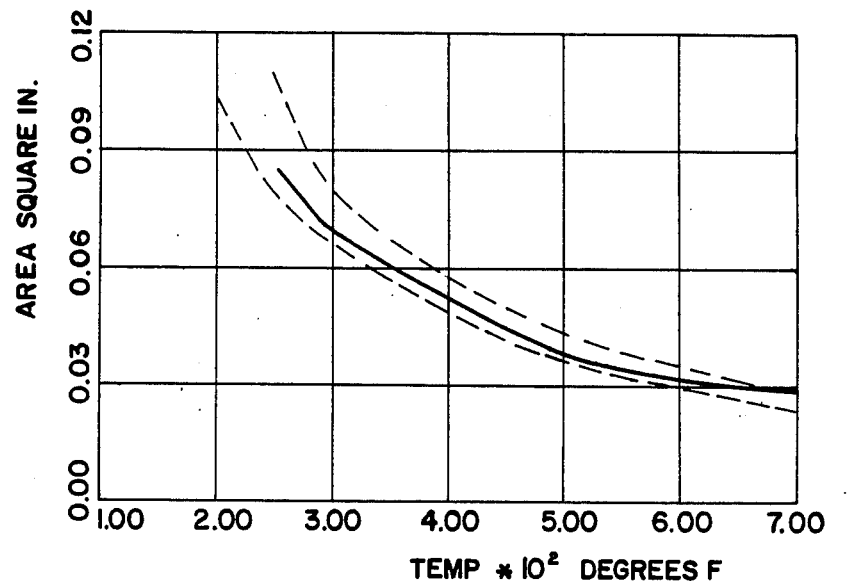
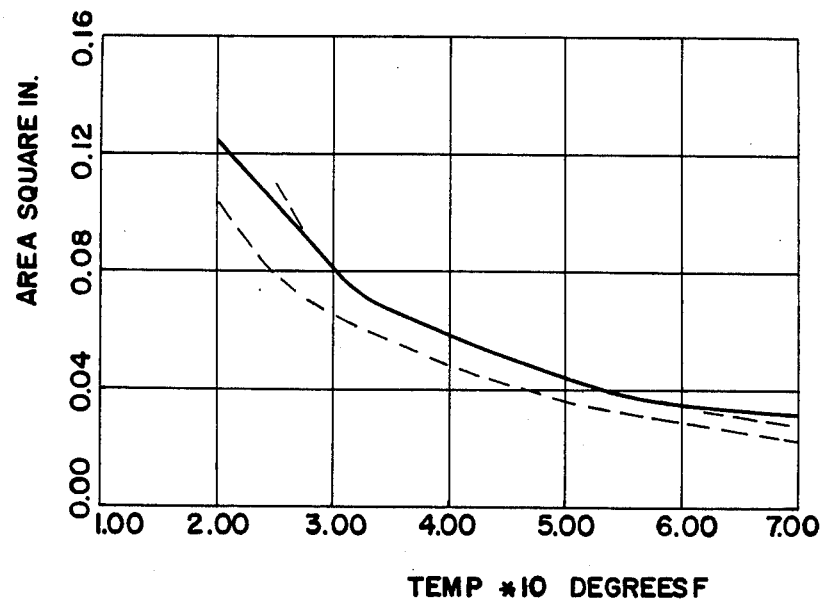

THERMAL MODULATING CONTROL VALVE

BACKGROUND OF THE INVENTION

1. Field of the Invention

The present invention relates to thermal modulating control valves and more particularly to a thermal modulating control valve of the type used in aircraft for supplying bleed air at regulated flow rates for aircraft anti-icing systems. More particularly, the new and improved thermal modulating control valve of the present invention is especially adapted for use in aircraft having a plurality of sources of bleed air available for use in aircraft anti-icing and other aircraft operating systems such as air conditioning, cabin pressurization and air turbine drive systems, etc.

2. Background of the Prior Art

In modern day jet aircraft, many aircraft systems are operated with "bleed air" which comprises pressurized high temperature air supplied from compressor sections of the jet turbine engines. Bleed air control valves for supplying bleed air to various aircraft systems at thermally modulated temperatures must necessarily be capable of withstanding relatively high temperatures up to 800° F. and must have a long and useful service life with a fail-safe feature designed to provide "bleed air" for essential aircraft systems operation even though an aircraft electrical system failure may have occurred.

OBJECTS OF THE PRESENT INVENTION

It is an object of the present invention to provide a new and improved thermal modulating control valve and more particularly a new and improved bleed air valve for supplying thermal modulated bleed air for aircraft anti-icing systems and other aircraft systems.

More particularly, it is an object of the present invention to provide a combination valve of the character described which is suitable for supplying thermally modulated bleed air for aircraft anti-icing systems along with unmodulated bleed air for other aircraft operating systems as desired.

In addition, it is an object of the present invention to provide a bleed air control valve of the character described which is suitable for use in supplying bleed air which is provided from a plurality of separate sources on the aircraft.

Yet another object of the present invention is to provide a new and improved thermal modulating bleed air valve of the character described which is responsive to provide a regulated flow rate of bleed air, which flow rate is reduced in response to an increase in temperature of the bleed air being supplied to the valve from an aircraft source.

Yet another object of the present invention is to provide a new and improved bleed air valve of the character described which combines a thermal modulating valve for use in supplying aircraft anti-icing systems along with a valve capable of supplying unmodulated bleed air for other aircraft systems, which bleed air is provided from a plurality of separate sources on the aircraft.

Yet another object of the present invention is to provide a new and improved combination bleed air valve of the character described which includes a control system for selecting a particular source of bleed air to be supplied to the valve for aircraft systems operation.

Yet another object of the present invention is to provide a new and improved bleed air valve combination of the character described having a failsafe feature wherein bleed air is available for aircraft systems operation even though an electrical failure may have occured.

Yet another object of the present invention is to provide a new and improved bleed air control valve of the character described which is exceptionally reliable in operation and which has a long and useful service life capable of a large number of repetitive operating cycles before excessive wear or failure occurs.

Yet another object of the present invention is to provide a new and improved combination anti-icing and plural source bleed air valve which has extremely low leakage characteristics and which is compact in size, light in weight and relatively rapid in operational response to changes in temperature of the bleed air supplied to the valve.

BRIEF SUMMARY OF THE PRESENT INVENTION

The foregoing and other objects and advantages of the present invention are accomplished in an illustrated embodiment thereof comprising a new and improved control valve for supplying thermally modulated bleed air for use in aircraft anti-icing systems. The valve includes a body having an inlet adapted to be supplied with bleed air from a separate source on the airplane and an anti-icing outlet for supplying thermally modulated bleed air for operating the aircraft anti-icing system. The thermal modulating valve is mounted in the body in communication between one inlet port and an anti-icing outlet port and is designed to regulate the flow rate of bleed air supplied to the anti-icing outlet port in response to bleed air temperature changes so that a reduction in flow rate occurs as the temperature of incoming bleed air increases.

The thermal modulating valve includes at least one annular seating ring having a central bore and mounted on a support element, and the seat ring has an annular ring sleeve spaced outwardly of the port element with at least one radial annular face concentrically mounted on the support element. At least one annular, bimetal, temperature sensitive creep disc is mounted on the support element and has an outer edge portion deformable toward and away the annular face of the ring sleeve in response to temperature changes for regulating the flow of bleed air between the disc and seat ring. As the temperature of incoming bleed air increases, the effective flow area between the disc and face of the seating ring is reduced and the opposite occurs when the temperature of incoming bleed air supplied begins to decrease.

In addition, the bleed air valve in accordance with the present invention includes a controllable shuttle valve mounted in the valve body and movable to selectively interconnect one or the other of a plurality of separate, high and low pressure bleed air inlets for supplying bleed air to the outlet or an outlet chamber. A pressure relief system is also incorporated for safety in the event that the bleed air pressure becomes excessive. Control of the valve and components thereof is facilitated by the use of modular, electrical solenoid systems which are selectively operable to control the output of bleed air to the aircraft anti-icing outlet port and to other systems in the aircraft from right and left unmodulated outlet ports.

BRIEF DESCRIPTION OF THE DRAWINGS

For a better understanding of the present invention, reference should be had to the following detailed description taken in conjunction with the drawings, in which:

FIG. 2A is a cross-sectional valve substantially similar to FIG. 2 but illustrating a shuttle valve of the valve mechanism in an alternate operative position;

FIG. 3 is an end elevational view of the valve illustrating an end opposite that shown in FIG. 1;

FIG. 4 is a top side elevational view of the valve;

FIG. 4A is a fragmentary, sectional view of a modular solenoid assembly of the valve looking in the direction of arrows 4A of FIG. 4;

FIG. 4B is an enlarged fragmentary cross-sectional view taken substantially along line 4B of FIG. 4A;

FIG. 4C is a cross-sectional view taken substantially along lines 4C—4C of FIG. 4A;

FIG. 4D is an enlarged, fragmentary cross-sectional view taken substantially along lines 4D—4D of FIG. 4A;

FIG. 4E is an enlarged, fragmentary cross-sectional view similar to FIG. 4D of an alternate embodiment of a modular solenoid valve assembly in accordance with the features of the present invention;

FIG. 5 is a fragmentary, cross-sectional view taken substantially along lines 5—5 of FIG. 3 showing in enlarged detail a relief valve assembly of the valve;

FIG. 6 is a fragmentary elevational view of the valve looking in the direction of arrows 6—6 of FIG. 1;

FIG. 7 is a schematic flow diagram of the valve showing the various flow paths for bleed air through the valve components; and FIG. 8 is a graphical representation of typical operating characteristics of the valve in accordance with the present invention.

DESCRIPTION OF A PREFERRED EMBODIMENT OF THE INVENTION

Figure 1:
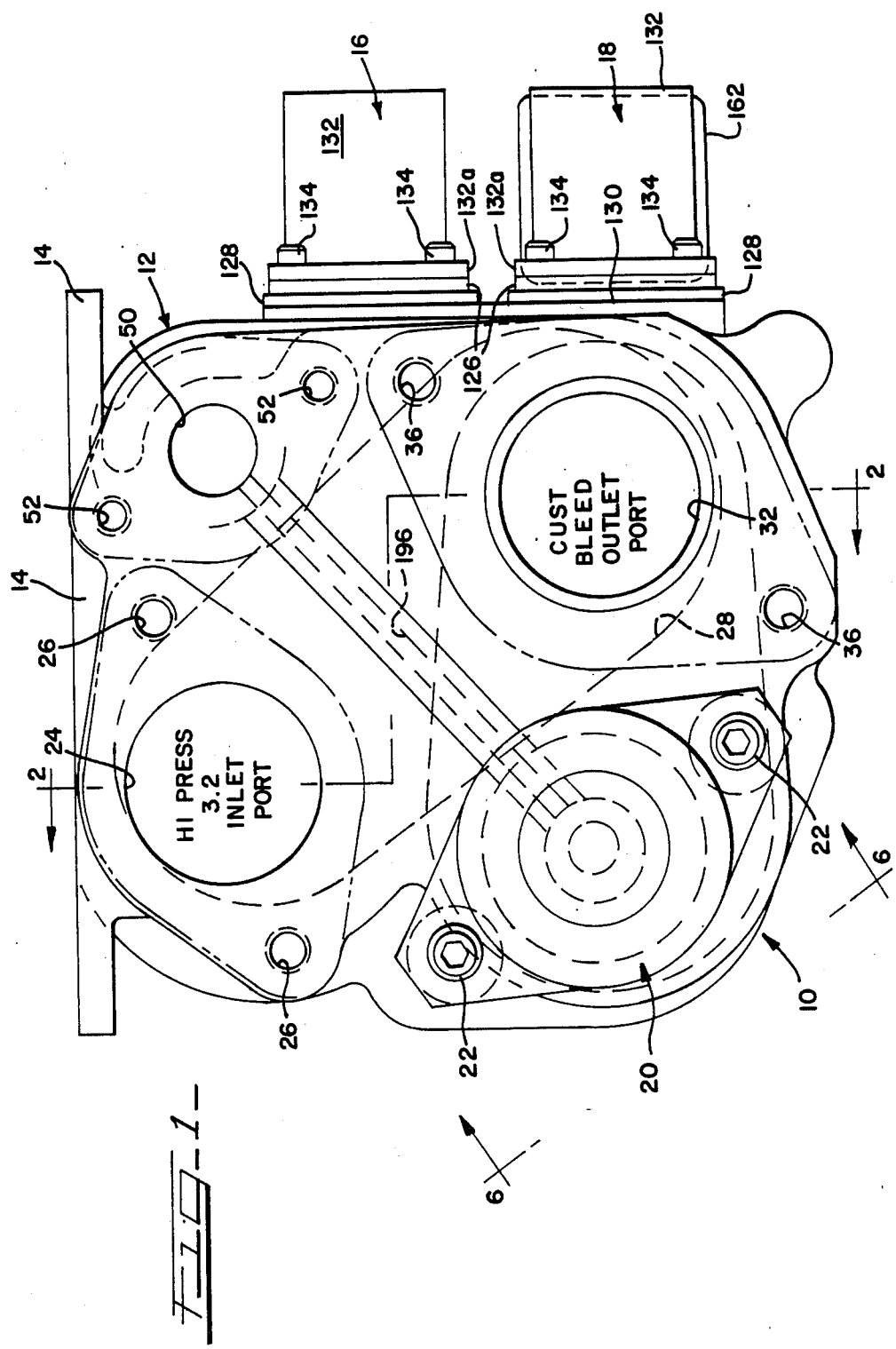
FIG. 1 is an end elevational view of a new and improved thermally modulated, bleed air control valve constructed in accordance with the features of the present invention.

Referring now more particularly to the drawings, therein is illustrated a new and improved control valve for supplying thermally modulated bleed air for aircraft anti-icing purposes and for supplying unmodulated bleed air from a plurality of sources on the aircraft for use by other aircraft systems. The control valve is referred to generally by the reference numeral 10 (FIGS. 1-4) and includes a body 12 formed of cast titanium which is capable of handling high temperature ranges encountered with temperatures of up to 800° F. as commonly encountered in bleed air taken from the compressor sections of modern turbo-jet engines. The cast body valve body 12 includes a pair of integrally formed, transversely extending, spaced apart mounting feet 14 provided at the upper end portion of the body and each of the mounting feet is provided with a circular opening 15 adjacent an outer end portion for mounting the valve body on an aircraft bulkhead or other structural members with fasteners such as bolts and the like.

Figure 2:
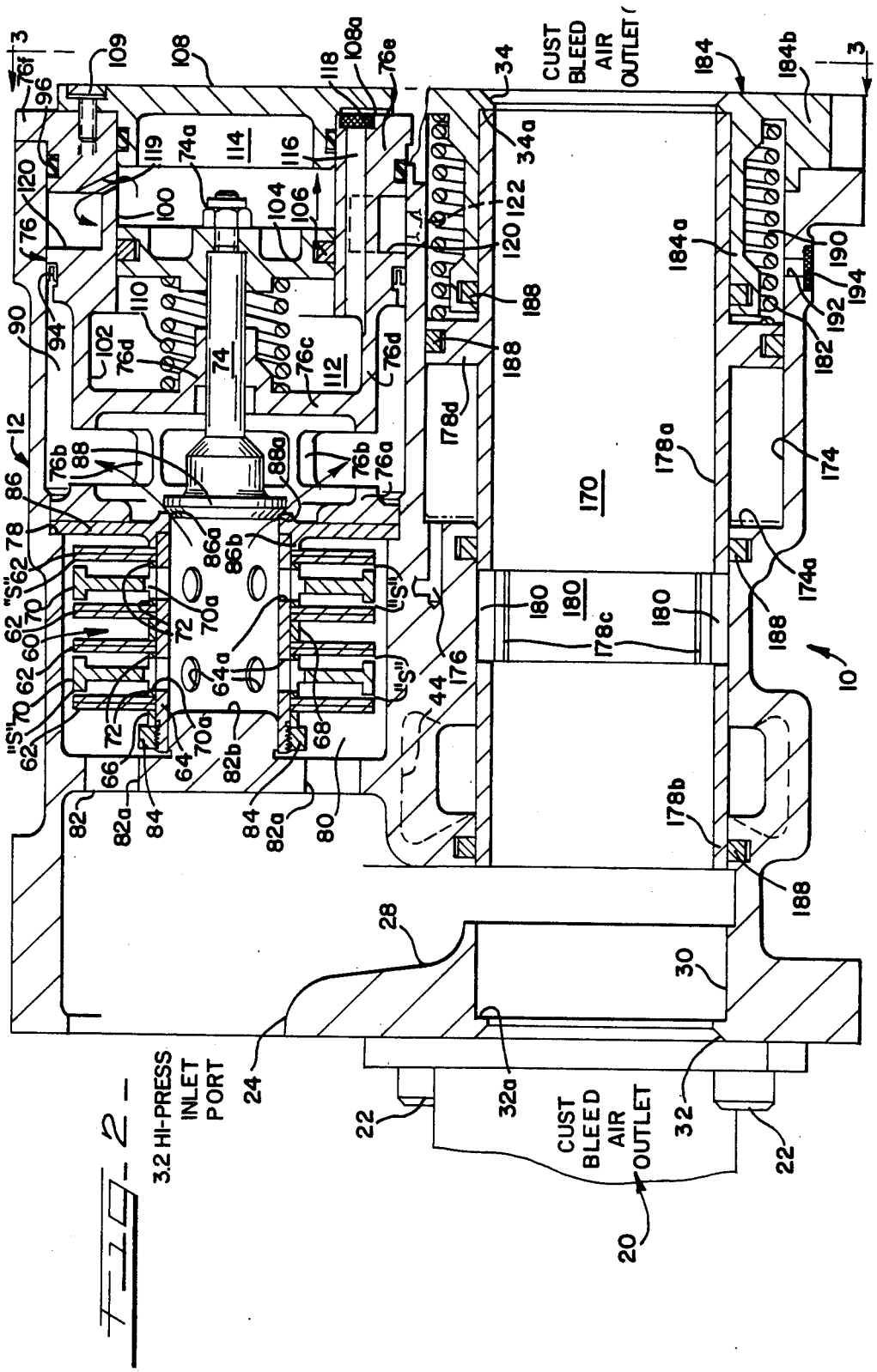
FIG. 2 is a longitudinal, end to end cross-sectional view of the valve taken substantially along lines 2—2 of FIG. 1.

A pair of modular, solenoid activated control valve modules 16 and 18 are mounted on a back the valve body 12 and a modular, pressure sensing switch 20 is mounted on a right side of the valve body (as shown in FIGS. 1 and 2) and is attached thereto by a pair of cap screws 22. As shown in FIGS. 1, 2 and 2a, the valve body 12 is provided with an inlet port 24 for receiving high pressure bleed air from an aircraft engine compressor stage and the port is spaced above the pressure switch 20. A pair of diametrically opposed threaded apertures 26 are provided on opposite sides of the high-pressure inlet port 24 to facilitate the connection of a flanged supply conduit for directing high pressure bleed air into the port for distribution within the valve body.

The high pressure inlet port 24 is in communication via an internal supply passage 28 to a right hand portion of a shuttle valve cylinder bore 30 having right hand and left hand bleed air outlet ports 32 and 34 on opposite ends of the valve body 12. These outlets are adapted to supply bleed air to various aircraft systems connected thereto. The right hand bleed air outlet port 32 is provided with a pair of threaded apertures 36 at diametrically opposed positions to facilitate connection of a flanged conduit for supplying bleed air to aircraft systems and the left hand bleed air outlet port 34 is similarly provided with a pair of diametrically opposed threaded apertures 38 on opposite sides thereof.

The valve body 12 is additionally provided with a low pressure bleed air inlet port 40 on the left side thereof adapted to receive a supply of low pressure bleed air from a compressor stage of the aircraft engines or from bleed air manifold on the aircraft. The low pressure port is provided with a pair of diametrically opposed threaded apertures 42 on opposite sides thereof (FIG. 3) to facilitate the connection of a flanged inlet fitting supplying low pressure bleed air to the valve body. Internally of the valve body, the low pressure inlet port 40 is in communication with the shuttle valve bore or cylinder 30 via an internal passage 44 which opens onto the bore 30 at a position longitudinally spaced to the right of the passage 28 leading from the high pressure inlet port 24 as best shown in FIGS. 2 and 2A.

In accordance with the invention, the valve body 12 is provided with a relief outlet or venting port 46 on the left hand end for venting to the atmosphere excessive pressure which may be present in an internal passage 48 which is provided for supplying a thermally modulated controlled flow of bleed air to an (A-I) anti-icing outlet port 50 adapted to be connected to an aircraft anti-icing system. The anti-icing outlet port 50 is defined on a right hand end of the valve body and a pair of threaded apertures 52 are provided at diametrically opposed locations on opposite sides of the anti-icing outlet port to facilitate connection of an aircraft anti-icing system to the temperature modulated bleed air flow supplied from the anti-icing port.

As best shown in FIG. 5, the outlet or relief vent port 46 is defined in a flanged cap element 54 secured in place on the body 12 by a plurality of cap screws 56 spaced equilaterally around the relief port. The cap member 54 is provided with an annular outlet recess 54a adapted to receive the end of a vent pipe or conduit 58 for venting relief valve discharge to the atmosphere.

In accordance with the present invention, the valve 10 includes a thermal modulator valve assembly 60 adapted to receive a supply of pressurized, high temperature bleed air from the high pressure bleed air inlet port 24 and the thermal modulator valve is operative to control the flow of bleed air supplied to the anti-ice passage 48 leading to the (A-I) anti-icing outlet port 50 so that the flow volume of bleed air supplied to the outlet port is reduced in response to increasing temperature of bleed air supplied to the inlet port 24 and is increased in response to a decrease in bleed air temperature. The modulating valve is mounted in coaxial alignment with the inlet port 24 in a valve chamber 80 separated from the inlet port by an integral wall 82 having a plurality of inlet passages 82a spaced equilaterally around the control axis of the valve chamber.

For the purpose of regulating the flow rate of the bleed air moving from the inlet port 24 to the (A-I) anti-icing outlet 50, the thermal modulator valve 60 includes a plurality of annular, bimetal, creep discs 62 mounted on a common, perforated, stainless steel tube 64 having longitudinally and radially spaced ports or perforations 64a therein.

An inlet end of the hollow tube 64 is mounted on a centrally positioned, cylindrical boss 82b formed on the inlet wall 82a and a nut 84 is threaded onto the inlet end of the support tube and tightened to a selected torque value against an annular spacer 66.

Adjacent an outlet end of the valve chamber 80, the central support tube 64 is nickel brazed to an annular, stainless steel end wall 86 which closes the outlet end of the valve chamber outside of the tube 64 and provides a central discharge opening surrounded by a frustoconical valve seat 86a designed to interact with a frustoconical seating surface 88a of a poppet valve 88. The poppet valve is mounted for reciprocal movement in centered coaxial alignment in an output chamber 90 in communication with the anti-icing outlet passage 48 via an internal passage 92 (FIG. 7). The end wall 86 is provided with a shoulder 86b on an inner face around the support tube 64 which engages a creep disc 62 around the central bore thereof.

In accordance with the invention, a total of four (4) creep discs 62 are mounted on the central support tube 64 between the spacer 66 and the shoulder 86b, and between first and second pairs of creep discs there is provided an annular seat ring 70 having an "I-shaped" radial cross-section. Each seat ring includes cylindrical base segment mounted on the support tube 64 and formed with ports 70a in communication with the ports 64a on the support tube. On opposite sides of the base segment of each seat ring, a thin annular shim 72 is mounted to provide a space between the seat ring and the confronting face of an adjacent creep disc 62. An annular spacer or shim 68 is also provided between the inner pair of creep discs 62 and the nut 84, when tightened, firmly secures the creep discs, shims, spacers and seat rings in an integral unit or subassembly on the supporting tube 64 attached to the end wall 86.

Each "I-shaped", annular seat ring 70 includes an outer wall segment of cylindrical shape having an outer diameter substantially equal to the diameter of the creep discs 62 and each outer wall segment provides a pair of oppositely facing, radial, annular, flow controlling valve seating surfaces for confronting an outer face of an adjacent creep disc to provide a variable flow regulating passage in response to relative movement of a creep disc toward and away from the annular seating surface.

The shims 72 are chosen with a selected thickness and this thickness determines the amount of space "S" between each creep disc 62 and a confronting annular valve seating surface of the outer wall segment of the seat rings 70 when the valve is cold as shown in FIG. 2.

When hot bleed air is supplied to the valve chamber 80 through the passages 82a in the wall 82, the creep disc 62 are heated up and tend to move out of a flat or planar configuration (FIG. 2) toward a shallow, spherical shape wherein the outer faces of the discs move to a closer spacing ("s"—FIG. 2A) toward the annular confronting faces of the seat rings 70. This movement reduces the effective flow area between the "I-shaped" seat rings and the creep discs 62 so as to regulate or modulate the flow of bleed air into the interior of the support tube 64 in response to the temperature of incoming bleed air supplied to the valve 10 through the high pressure bleed air inlet port 24. At a selected maximum temperature value (i.e., 800° F.), the creep discs 62 will almost touch or close against the seating surfaces of the "I-shaped" seating rings 70 to shut off the flow of bleed air to the interior of the support tube 64 entirely, if desired, as a valve characteristic.

The poppet valve 88 is supported for reciprocal movement along the central longitudinal axis of the chamber 90 by means of a valve stem 74 mounted at the center of a cast titanium frame 76 which is inserted into the valve body 12 from right to left as viewed in FIGS. 2 and 2A, until the annular end wall 86 is seated in a shoulder 78 around the end of the valve chamber 80 which joins the chamber 90. The end wall 86 is secured to an annular inner end wall 76a of the frame structure 76 which includes a plurality of longitudinal legs 76b integrally joined to a radial wall segment 76c spaced parallel of the end wall 86. The radial wall segment is formed with a central bore in a central boss portion 76d for slidably receiving the stem 74 of the poppet 88. Around the outer edge, the wall segment 76c is integrally joined to a cylindrical skirt 76d having an inner section with an outer diameter less than the diameter of the chamber 90. The skirt includes a thick wall segment 76e at the outer end portion having a diameter slightly less than that of the chamber 90 and sealed against the surface of the chamber by an inner seal ring 94 of U-shaped cross-section and an outer "O-ring" 96. The frame 76 is secured in place on the valve body 12 by means of an outer end flange 76f and a plurality of cap screws 98 (FIG. 3).

In accordance with the invention, the thick cylindrical wall segment 76e of the frame defines an outer cylindrical bore or piston chamber 100 and the inner thin wall segment 76d of the cast titanium frame defines an inner cylindrical bore 102 of greater diameter than the bore 100. A piston 104 of aluminum having a carbon or steel piston ring 106 is slidably mounted in the outer piston chamber 100 between the wall segment 76b and an outer end cap 108 secured on the frame 76 with cap screws 109 to close the outer end of the cylinder bore 100. The piston 104 is secured to a threaded outer end portion of the poppet stem 74 with a cap screw 74a and moves in unison with the poppet valve 88 toward and away from the valve seating surface 86a.

The piston 104 is biased toward the outer end 108 of the cylinder bore 100 by a coiled spring 110 seated in the large diameter bore 102 between the wall segment 76c and the inside face of the piston. The piston divides the cylindrical bores 102 and 100 within the frame 76 to form an inner vent chamber 112 and outer control chamber 114. The inner chamber 112 is continuously vented to the atmosphere through a longitudinal vent passage 116 in the thick wall segment 76e, a filter screen 118 and a radial vent passage 108a on the inside surface of the flange of the end cap 108. Whenever the outer control chamber 114 is maintained at atmospheric pressure, the spring 110 is effective to bias the piston 104 outwardly and move the poppet valve 88 away from the seating surface 86a on the end wall 86. When the poppet is thus opened, a temperature modulated flow of bleed air is supplied to the (A-I) anti-icing outlet port 50 from the chamber 90 via the passages 92 and 48 (FIG. 7) for use in aircraft anti-icing operations.

Selective control of the poppet valve 88 to close and open relative to the seat 86a is achieved by supplying pressurized bleed air to the outer control chamber 114 to overcome the biasing force of the spring 110 to close the poppet or in the alternative, the chamber 114 is vented to the atmosphere allowing the pressure on opposite sides of the piston to equalize so that the spring will open the valve. In order to control the pressure in the outer chamber 114, a radial passage 119 is provided between the bore 100 at the outer end and an annular recess 120 formed on the outer surface of the thick wall section 76e of the frame structure 76. The recess 120 is in communication with an internal control passage 122 opening into the chamber 114 at one end and into a small bleed air chamber 124 at the opposite end adjacent the anti-icing solenoid control valve module 16 (FIG. 7).

The respective solenoid control valve modules 16 and 18 are substantially identical and only one will be described herein in detail. Each module is mounted on an orifice plate 126 which is secured against a heat insulating gasket 128 of asbestos or the like, adjacent a flat surface 130 formed on the back side of the valve body 12. The insulating gaskets thermally isolate the solenoid modules from the valve body so that operation of the modules is not adversely affected by heat because of the high temperatures involved.

Each solenoid module 16 and 18, includes a hollow body 132 (FIGS. 4A and 4C) having an inner open end provided with a peripheral flange 132a for detachably mounting the solenoid and adjacent orifice plate 126 on the flat surface 130 of the valve body 12 with a plurality of cap screws 134 at corners of the flange. The cap screws 134 pass through apertures in the peripheral flange 132a of the solenoid body, through aligned apertures 126a at the corners of the orifice plate 126 and through aligned apertures in the gasket 128. The cap screws are threaded into apertures provided in the valve body 12 on the flat surface 130 and the heads of all assembly bolts are safety wired or self locking in accordance with standard aircraft safety procedures.

Referring also to FIG. 7, the short control passage 124a is provided to communicate between the internal control passage 144 and an eccentric control passage 126b in the orifice plate 126. A centrally positioned passage 124b is provided to communicate between the supply passage 136 and the interior of the solenoid chamber 144 through an aligned central passage 126c in the orifice plate 126. Bleed air is supplied to the central chamber 144 from a bleed air inlet passage 124b, and the port is supplied with bleed air through a supply passage 136 connected to the high pressure bleed air passage 28 in communication with the high pressure inlet port 24.

Referring to FIG. 4C, the inner end of the passage 126c is in communication with the passage 124a and in one embodiment of the invention is shown as being closed by a small, spherical valve ball 138 seated in a recess provided in the inner end of a magnetic armature 140 which is biased by a spring 142 to seat the ball against the inner end of the passage and thereby prevent the entry of bleed air into the interior of the solenoid body 132. The armature 140 is mounted in a central chamber 144 and is provided with a plurality of longitudinal, spaced apart ribs or flutes 140a to guide the armature for axial sliding movement therein and provide a flow passage from control passage 126b to the exhaust passage 146a. The cylindrical armature chamber is closed at an inner end by the orifice plate 126 and is provided with an annular outer end wall 146 having a central, exhaust passage 146a therein for exhausting control pressure of control chamber 114 air to the atmosphere through an exterior vent hose 148 communicating with the outer end of the passage 146a through an opening 132b provided in the outer wall of the solenoid body 132.

The magnetic armature 140 also includes a second spherical valve element or ball 150 mounted in an axial recess in the outer end face of the armature and this ball is adapted to seat against the end member 146 around the periphery of the exhaust passage 146a. The armature is dimensioned in length so that when the inner ball 138 is seated to close the passage 126c, the outer ball 150 is open with respect to the passage 146a and, in the alternative, when the armature is pulled in by energization of the solenoid, the outer ball 150 is seated against the inner end of the passage 146a.

In accordance with the invention, the armature chamber 144 is defined by a cylindrical wall 152 secured around a thickened circular central boss portion 146b on the outer circular annular wall plate 146. The tubular chamber wall 152 cooperates with an integral, cylindrical, chamber wall 154a formed on an annular, circular shaped, inner wall plate 154 having a radial, planar outer face portion seated against the outer face of the adjacent orifice plate 126. The circular radial portions of the plates 146 and 154 and the outer surface portions of cylindrical sleeves 152 and 154a define a spool-like base for accommodating the annular winding of an electrical, DC powered solenoid coil 156 which is normally energized by DC current when the aircraft electrical system is powered up. DC current is supplied through lead wires 158 and is controlled by a switch (not shown) remote from the solenoid module. When the solenoid coil 156 is deenergized by the switch or by electrical failure, the spring 142 biases the ball 138 on the armature 140 to close the passage 126c on the orifice plate 126. In this condition, atmospheric air pressure obtains in the armature chamber 144 through the vent hose 148 and the passage 146a in the outer annular end wall 146. The flutes or ribs 140a on the armature 140 permit atmospheric air pressure to be maintained within the armature chamber 144 and this same atmospheric pressure also obtains in the outer control valve chamber 114 because of the direct communication between the chambers via the interconnected recess 126d and passage 126b in the orifice plate 126, the control passage 124a, the small bleed air chamber 124, the body passage 122, the annular recess 120 in the frame 76 and the short passage 119.

Referring momentarily to the alternate embodiment of FIG. 4E, instead of a ball 138 at the inner end of the armature 140 for opening and closing relative to the passage 126c of the orifice plate 126, which passage leads to the chamber 124, the armature is provided with an elongated valve stem 160a slidable in the passage 126c and having a conical valve member 160 designed to open and close relative to the inlet port 124c for supplying bleed air to the small bleed air chamber 124.

The valve stem 160a is joined to the armature body at the inner end and extends axially outwardly thereof into the small bleed air chamber 124 to move the valve member 160 between open and closed portions relative to the inlet port 124c.

When the solenoid winding 156 is energized through the leads 158, the armature 140 is "pulled in" to compress the armature spring 142 and seat the ball 150 against the exhaust passage 146a in the outer annular end wall or plate 146.

In the embodiment of FIG. 4C when the solenoid 156 is energized, the ball 138 at the inner end of the armature moves away from the passage 126c and permits the pressurized bleed air from the passageway 124c to flow through the passage 126b into the armature chamber 144 and then flow through the passage 126b, slot or recess 126d and passages 124a and 122 into the inner poppet valve control chamber 114.

In the alternate embodiment of FIG. 4E, the valve member 160 is seated against the port 124c and is pulled away upon energizing of the solenoid coil 156, and this action permits bleed air from the supply passage 136 to move directly through the small bleed air chamber 124 into the passage 122 and eventually into the poppet valve control chamber 114.

When pressurized bleed air is present in the control chamber 114, the valve 88 is maintained in the closed position as shown in FIGS. 2 and 7 until the solenoid winding 156 is deenergized, either inadvertently by failure of the aircraft electrical system or by activation of a cockpit switch controlling DC power to the solenoid. When the solenoid coil is deenergized, the inner, control valve chamber 114 is exhausted or vented to the atmosphere and the poppet valve 88 moves to the open position because of the unbalanced force of the spring 110 on the piston 104. This fail-safe action admits pressurized bleed air into the chamber 90 and the passages 42 and 48 so that bleed air is available for aircraft anti-icing at the port (A-I) 50 even though aircraft electrical failure has occurred.

The solenoid body 132 is formed with a conduit inlet section 162 for the leads 158 and for other leads 164 bundled therewith. The conduit inlet section is open at the outer end in order to receive a flanged, attachment fitting 166 secured in position therein by cap screws 167. The fitting 166 is formed with an annular, conduit connector section 168 for connection to an electrical conduit of the aircraft.

The orifice plates 126 are secured to the inner, armature chamber end walls or plates 154 by a pair of cap screws 169 having heads seated in a pair of circular recesses 126e provided in the orifice plates. In turn, the orifice plates are secured to the inner, flanged end of the solenoid housing 132a by a pair of countersink head cap screws 165 so that the entire solenoid housing assembly can be rapidly assembled and disassembled from the flat surface 130 of the valve body 12 by tightening and loosening the cap screws 134 as previously described. The orifice plates 126 also include circular openings 126f for accommodating a bundle of leads 164 which extend into other passages provided in the valve body 12 and open onto the flat surface 130 on the back side of the body, such as a passage (not shown) leading to the pressure sensing switch 20.

The modular, solenoid control valve assembly 18 is substantially identical to the module 16 and is effective to control the movement of a hollow, tubular shuttle valve 170 slidably disposed in the shuttle valve bore 30 for movement between opposite end stops 32a and 34a as shown in FIG. 2. The solenoid module 18 is mounted on the flat surface 130 with a gasket 128 disposed between an orifice plate 126 and the flat surface. The valve body 12 is provided with a second small bleed air chamber 172 similar to the small bleed air chamber 124 as previously described and the bleed air chamber 172 is in communication with the bleed air supply passage 136 through an inlet port 172b which is opened and closed by the solenoid controlled spherical valve element 138. The valve body 12 is provided with an aligned passage 172b in direct communication with the central passage 126c of the orifice plate 126 of the solenoid module 18. The small bleed air chamber 172 also includes a control passage 172a in communication with the slot 126d and passage 126b of the orifice plate 126 to vent the chamber 172 to the atmosphere through the vent hose 148 when the spherical valve element 138 is closed against the bleed air inlet port 172b as shown in FIG. 7.

The chamber 172 is in communication with an enlarged bore section 174 formed in coaxial alignment around a right hand end portion of the shuttle valve bore 30 as shown in FIG. 2. This enlarged bore section is vented or pressurized to the chamber 172 through a control passage 176 opening onto a radial end wall 174a of the enlarged bore as shown in FIGS. 2 and 2A. The shuttle valve 170 is slidably disposed in the bore 30 for movement between alternate positions for supplying unmodulated high pressure bleed air from the high pressure inlet port 24 to the left and right outlet ports 34 and 32 when the shuttle valve is in the position shown in FIG. 2. When the shuttle valve is moved to the position of FIG. 2A, lower pressure bleed air supplied from the alternate or low pressure bleed air port 40 is directed to the outlet ports 32 and 34 and high pressure bleed air from the inlet port 24 is cut off.

The shuttle valve comprises an elongated hollow, tubular element divided into a relatively long segment 178a adapted to cooperate with the end stop 34a and a relatively short segment 178b at the opposite end adapted to cooperate with the stop 32a. The segments 178a and 178b are interconnected by longitudinally extending fingers 178c which define a plurality of large radial ports 180 spaced intermediate between the segments 178a and 178b. When the shuttle valve 170 is in the position shown in FIG. 2, the outer end of the short segment 178b is spaced inwardly of the passage 28 connected to the high pressure inlet port 24. In this position, the wall segment 178b closes off the flow of low pressure bleed air from the passage 44 which is in communication with the alternate low pressure bleed air supply port 40.

In the alternate position as shown in FIG. 2A, the radial ports 180 between the shuttle valve segments 178a and 178b are aligned directly with the low pressure passage 44 so that low pressure bleed air flows into the hollow shuttle from the low pressure bleed air port 40 to pass outwardly through the bleed air outlet ports 32 and 34.

The shuttle valve segment 178a is formed with an outwardly extending, radial piston segment 178d which is slidably disposed within the large diameter bore segment 174. As viewed in FIG. 2, the shuttle valve 170 is biased toward the left by an annular coiled spring 182 disposed around an inwardly extending cylindrical bore section 184a of an end cap member 184 which closes the outer end of the large diameter bore 174 and forms the outlet port 34 as illustrated. The end cap 184 has an outer end flange 184b secured to the valve body by a pair of cap screws 186 as shown in FIG. 3. The spring 182 biases the shuttle valve 170 towards the outlet port 32 and as illustrated in FIG. 2, when the modular solenoid control 18 is activated to supply bleed air pressure from the small bleed air chamber 172 to the passage 176 leading to the large diameter bore 174, the spring is compressed and the shuttle valve sleeve moves to the position shown because of bleed air pressure acting on the annular piston segment 178d to compress the spring. When the solenoid coil 156 of the modular solenoid assembly 18 is deenergized either by aircraft electrical failure or by a pilot turning a remote switch to off, the spherical valve element 138 closes the supply of inlet bleed air to the chamber 172 and the passage 176 permits the bleed air to be evacuated and vented to the atmosphere from the large diameter bore section 174. When this occurs, the spring 182 is effective to move the shuttle valve 170 to the position shown in FIG. 2A wherein a supply of bleed air from the low pressure port 40 is carried into the hollow interior of the shuttle valve through the passage 44 to provide low pressure bleed air at the outlets 32 and 34. This arrangement provides a fail-safe feature wherein at least a supply of low pressure bleed air will be provided in the event of electrical failure rather than a high pressure supply of bleed air from the port 24. The valve piston segment 178b prevents any interflow between the high pressure port 24 and the low pressure port 40 which could result in engine failure.

In order to prevent leakage of bleed air around the shuttle valve 170, a plurality of longitudinally spaced apart piston rings 188 are provided in annular grooves formed in the bore 30, the bore sleeve 184a of the cap member 184 and the annular piston section 178d of the shuttle valve. As viewed in FIGS. 2 and 2A, a space within the large diameter bore segment 174 between the outwardly facing side of the shuttle valve piston section 178d and the outer flange portion 184b of the cap member 184 form an outer vent chamber 190 which is continually vented to the atmosphere through a short passage 192 and a screen 194.

In accordance with another feature of the present invention, the control valve 10 is provided with a pressure sensing switch 20 secured to the valve body by cap screws 22 in order to provide a cockpit indication of the bleed air pressure being supplied to the aircraft anti-icing system through the (A-I) anti-ice outlet port 50. For this purpose, a passage 196 is provided in the valve body 12 to communicate between the internal anti-ice passage 48 adjacent the (A-I) anti-icing port 50 and the pressure sensing switch housing so that the bleed air pressure may be sensed by the pressure switch 20 and transmitted through electrical lead wires 164 to a cockpit instrument.

In order to prevent damage to an aircraft anti-icing system connected to the (A-I) anti-icing outlet port 50, the internal anti-icing passage 48 is connected to an axially aligned relief valve chamber 198 extending outwardly and in communication with the relief valve outlet port 46 and relief vent tube 58 as best shown in FIG. 5. A double-acting relief valve assembly 200 is mounted in the chamber 198 in coaxial alignment with an inwardly projecting, annular internal valve seat 202 at the inner end of the chamber 198 adjacent an inner end of a valve support frame 204. The relief valve support frame 204 includes a radial, outer end wall 204a sandwiched between an outer end of the valve body 12 in a section formed around the valve chamber 198 and an inner face of the cap member 54. The radial end wall 204a includes a plurality of equilaterally spaced ports 205 spaced radially outwardly around a hollow stem 204b on which is mounted a first coiled valve spring 206 adapted to bias a hollow sleeve 208 inwardly toward the seat 202 at the inner end of the relief valve chamber 198. An outer end portion of the hollow sleeve 208 is slidably mounted on the hollow stem 204b of the support frame 204 and the spring 206 is effective to bias the sleeve inwardly as illustrated in FIG. 5. The sleeve 208 also includes an outwardly extending, radial flange portion 208a intermediate its ends and a generally cylindrical hollow, outer valve element 210 is secured to the flange 208a by a plurality of cap screws 212. The hollow outer valve member includes an elongated cylindrical wall section 210a having a plurality of slots 211 formed therein extending longitudinally between an outer annular rim or base 210b joined to the flange 208a and secured thereto by the cap screws 212. At the inner end, the outer valve element 210 includes an annular rim 210c having a frusto-conical seating surface thereon adapted to engage and normally seal against the valve seat 202 at the end of the internal anti-icing passage 48.

An inner end portion of the hollow sleeve 208 provides a sliding support passage for a stem 214a of an inner valve member 214 having a radial flange segment 214b at the inner end with a frustoconical valve surface adapted to engage the edge of an internal aperture provided in the outer valve member 210 around the inside edge surface of the annular end segment 210c. A second valve spring 216 is mounted on the outer portion of the hollow sleeve 208 around the stem 214a to bias the flange 214b of the inner valve member 214 into a closed position with respect to the hollow, outer valve member 210. The spring preloads of the respective springs 206 and 216 are chosen so that the outer valve member 210 will open first and move away from the valve seat 202 to vent bleed air pressure upon reaching a selected pressure value. If the bleed air pressure continues to build up beyond a second value, the inner valve member 214 will then additionally open away from the annular valve seat 210c on the outer valve member 210 to afford an additional flow area for venting the excessive bleed air pressure out through the valve housing 198 to the exhaust port 46 and vent passage or tube 58.

The control valve 10 provides multiple control functions for use in controlling bleed air provided from a plurality of sources such as an engine compressor or bleed air manifold. The valve is adapted to provide a thermally modulated flow of bleed air for use in an aircraft anti-icing system, and a pressure sensing switch is provided for indicating the pressure of the bleed air being supplied to the anti-icing outlet port 50. A pressure relief valve 200 is provided to ensure that excessive bleed air pressure does not damage components in the engine or aircraft anti-icing systems.

In addition, the control valve 10 also provides for alternate selection of low and high pressure bleed air to be supplied to right and left hand bleed air outlet ports used for operating other aircraft systems. The valve provides fail-safe features in that if the aircraft electrical power is lost, the anti-icing supply will be unimpeded and similarly, the bleed air supplied to the unmodulated bleed air ports will be provided from the lower pressure source.

FIG. 8 provides a graphical representation of the flow area of the temperature modulating thermal valve 60 in relation to the temperature of the bleed air being supplied to the valve body 12. As illustrated, as the temperature goes up, the amount of flow area through the thermal modulator valve 60 is decreased so that overheating of the anti-icing system or an excessive loss of bleed air will not occur. The graphs in FIG. 8 are representative of valve operation at two different pressure levels and as illustrated, the curves are similar and illustrate that only a slightly smaller cross-sectional flow area results at higher operating pressures. The valve 10 provides simple, reliable hysteresis-free temperature sensitive, flow controlled modulation and embodies an aircraft bleed air control valve that is low in weight and extremely reliable in operation. Modular solenoid control assemblies provide easy and reliable controls and fail-safe features as set forth previously.

While there has been described what is at present considered to be the preferred embodiments of the invention, it will be understood that various modifications may be made therein which are within the true spirit and scope of the invention.

What is claimed as new and desired to be secured by Letters Patent of the United States is:

1. A bleed air valve for supplying thermo-modulated bleed air for engine or aircraft anti-icing and unmodulated bleed air from a plurality of sources, comprising,
a valve body having a plurality of inlets adapted to be supplied with bleed air from separate sources, and an outlet chamber for supplying bleed air to engine or aircraft systems,
shuttle valve means mounted in said body movable to selectively connect one or the other of said bleed air inlets for supplying bled air to said outlet chamber,
said valve body including an anti-icing outlet for supplying thermo-modulated bleed air for operating an engine or aircraft anti-icing system, and
thermo-modulating valve means separate from said shuttle valve means and mounted in said body in communication with at least one of said inlets for supplying thermo-modulated bleed air to said anti-icing outlet at a regulated flow rate which is reduced in response to an increase in temperature of the bleed air supplied from at least said one of said inlets.

2. The bleed air valve of claim 1, wherein,
said thermo-modulating valve means comprises at least one annular seat ring, having a central bore and mounted on a support element, said seat ring having an annular ring sleeve spaced outwardly of said support element having at least one radial annular face concentrically mounted on said support element, and at least one annular temperature sensitive disk mounted on said support element and having an outer edge portion deformable toward and away from said annular face in response to temperature changes to regulate the flow of bleed air between said disk and said annular face of said seat ring.

3. The bleed air valve of claim 2, wherein,
said seat ring includes a second opposite annular face on said annular ring sleeves, and
a second annular disk mounted on said support element and having an outer edge portion deformable toward and away from said second annular face in response to temperature changes to regulate the flow of bleed air between said second disk and said annular face of said seat ring.

4. The bleed air valve of claim 2, wherein,
said support element comprises a hollow sleeve having a plurality of ports to provide communication between the interior and exterior thereof, and
said seat ring having openings adjacent said bore for communication with said ports of said sleeve.

5. The bleed air valve of claim 3, wherein,
said support element comprises a hollow sleeve having a plurality of ports to provide communication between the interior and exterior thereof, and
said seat ring having openings adjacent said bore for communication with said ports of said sleeve.

6. The bleed air valve of claim 2, including,
a plurality of said annular seat rings spaced longitudinally on said support element and plurality of said disks mounted between said seat rings for relative movement toward and away from opposed annular faces thereof.

7. The bleed air valve of claim 2, wherein,
said temperature sensitive disk is deformed away from a substantially planar shape toward a spherically shaped surface in response to changes in temperature of said bleed air.

8. The bleed air valve of claim 2 including,
poppet valve means between said thermo-modulating valve means and said anti-icing outlet for shutting off or supplying thermo-modulated bleed air to said outlet for anti-icing.

9. The bleed air valve of claim 8 including,
solenoid actuated control valve means for selectively connecting and disconnecting a source of bleed air with said poppet valve means for opening and closing the same to control the output of thermo-modulated bleed air to said anti-icing outlet.

10. The bleed air valve of claim 2, including,
piston means on said shuttle valve means for moving the same between alternate positions for supplying bleed air from a selected inlet to said outlet chamber.

11. The bleed air valve of claim 10, including,
solenoid actuated control valve means for selectively connecting and disconnecting said piston means with a source of bleed air for moving said shuttle valve means between said alternate positions.

12. The bleed air valve of claim 11, including
resilient means for biasing said piston means to move said shuttle valve means toward one of said alternate positions.

13. The bleed air valve of claim 12 including,
passage means interconnecting one side of said piston means with said source of bleed air when said solenoid control means valve is actuated to move said shuttle valve means toward the other of said alternate positions.

14. The bleed air valve of claim 2 including,
annular shim means of selected thickness between said annular seat ring and said temperature sensitive disk for providing a desired spacing between said face of said seat ring and said outer edge portion of said disk at a particular temperature.

15. The bleed air valve of claim 14, wherein
said annular shim means is mounted on said support element between facing inner edge portions of said seat ring and said disk.

16. A bleed air valve for supplying thermo-modulated bleed air for engine or aircraft anti-icing, comprising,
a valve body having an inlet adapted to be supplied with bleed air from a separate source and an anti-icing outlet for supplying thermo-modulated bleed air for operating engine or aircraft anti-icing systems, and thermo-modulating valve means mounted in said body in communication with said inlet for supplying thermo-modulated bleed air to said anti-icing outlet at a regulated flow rate which is reduced in response to an increase in temperature of the bleed air supplied, said thermo-modulating valve means comprising at least one annular seat ring having a central bore and mounted on a support element, said seat ring having an annular ring sleeve spaced outwardly of said support element having at least one radial annular face concentrically mounted on said support element, and at least one annular temperature sensitive disk mounted on said support element and having an outer edge portion deformable toward and away from said annular face in response to temperature changes for regulating the flow of bleed air between said disk and said annuular face of said seat ring.

17. The bleed air valve of claim 16, wherein, said seat ring includes a second opposite annular face on said annular ring sleeve, and a second annular disk mounted on said support element and having an outer edge portion deformable toward and away from said second annular face in response to temperature changes for regulating the flow of bleed air between said second disk and annular face of said seat ring.

18. The bleed air valve of claim 16, wherein, said support element comprises a hollow sleeve having a plurality of ports to provide communication between the interior and exterior thereof, and said seat ring having openings adjacent said bore for communication with said ports of said sleeve.

19. The bleed air valve of claim 16, including, a plurality of said annular seat rings spaced longitudinally on said support element and a plurality of said disks mounted between said seat rings for relative movement toward and away from opposed annular faces thereof for regulating the flow of bleed air therebetween in response to temperature.

20. The bleed air valve of claim 16, wherein, said temperature sensitive disk is deformed away from a substantially planar shape toward a spherically shaped surface in response to changes in temperature of said bleed air.

21. The bleed air valve of claim 16 including, poppet valve means between said thermo-modulating valve means and said anti-icing outlet for shutting off or supplying thermo-modulated bleed air to said outlet for anti-icing.

22. The bleed air valve of claim 21 including, solenoid actuated control valve means for selectively connecting and disconnecting a source of bleed air with said poppet valve means for opening and closing the same to control the output of thermo-modulated bleed air to said anti-icing outlet.

23. The bleed air valve of claim 16 including, annular shim means of selected thickness between said annular seat ring and said temperature sensitive disk for providing a desired spacing between said face of said seat ring and said outer edge portion of said disk at a particular temperature.

24. The bleed air valve of claim 23, wherein said annular shim means is mounted on said support element between facing inner edge portions of said seat ring and said disk.

* * * * *

UNITED STATES PATENT AND TRADEMARK OFFICE
CERTIFICATE OF CORRECTION

PATENT NO. : 4,775,117

DATED : October 4, 1988

INVENTOR(S) : Helmut Standke

It is certified that error appears in the above-identified patent and that said Letters Patent is hereby corrected as shown below:

On the title page assignee should read

--(73) Assignee: Consolidated Controls Corporation --.

Signed and Sealed this

Twentieth Day of June, 1989

Attest:

DONALD J. QUIGG

*Attesting Officer*

*Commissioner of Patents and Trademarks*